(12) United States Patent
Jerrard-Dunne et al.

(10) Patent No.: US 8,196,099 B2
(45) Date of Patent: Jun. 5, 2012

(54) UPDATING APPLICATION DESIGN

(75) Inventors: Stanley Kieran Jerrard-Dunne, Dublin (IE); Bill Looby, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 11/314,517

(22) Filed: Dec. 21, 2005

(65) Prior Publication Data

US 2006/0150178 A1     Jul. 6, 2006

(30) Foreign Application Priority Data

Jan. 6, 2005  (GB) .................................. 0500151.6

(51) Int. Cl.
    *G06F 9/44* (2006.01)
(52) U.S. Cl. ......... 717/120; 717/101; 717/112; 717/168
(58) Field of Classification Search .................. 717/101, 717/120
    See application file for complete search history.

(56) References Cited

U.S. PATENT DOCUMENTS

| | | | | |
|---|---|---|---|---|
| 7,139,999 B2 * | 11/2006 | Bowman-Amuah | .......... | 717/101 |
| 7,222,330 B2 * | 5/2007 | Bicknell et al. | ............... | 717/101 |
| 2003/0055868 A1 | 3/2003 | Fletcher et al. | | |
| 2003/0135850 A1 | 7/2003 | Miloushev et al. | | |
| 2003/0195757 A1 * | 10/2003 | Greenstein | ........................ | 705/1 |
| 2004/0098706 A1 | 5/2004 | Khan et al. | | |
| 2004/0123285 A1 * | 6/2004 | Berg et al. | ..................... | 717/174 |
| 2004/0133660 A1 | 7/2004 | Junghuber et al. | | |
| 2005/0120384 A1 * | 6/2005 | Stone et al. | .................... | 725/132 |

* cited by examiner

*Primary Examiner* — Lewis A Bullock, Jr.
*Assistant Examiner* — Matthew Brophy
(74) *Attorney, Agent, or Firm* — David A. Dagg (57) ABSTRACT

A method and system for updating templated application design, which facilitates the later 'undoing' of the design update is provided. The method intercepts all design update requests and automatically creates and stores a description of the pre-update version of the application. When a developer intends to apply an update to a design of an application, the application is first asked to provide a description of itself, e.g. a template. If the application comprises a plurality of components, each application component provides a description. Thus a point-in-time design description of the application is created. This is stored and can later be used for an undo method or even multi-level rollback, as required.

12 Claims, 6 Drawing Sheets

UPDATING APPLICATION DESIGN

CROSS REFERENCE TO RELATED APPLICATIONS

The present application claims priority under 35 USC 119 to United Kingdom Application Number 0500151.6, filed Jan. 6, 2005.

FIELD OF THE INVENTION

The present invention relates to the field of data processing and in particular to a method and system for updating application design in order to facilitate design rollback at a later stage.

BACKGROUND OF THE INVENTION

A new design of an application, such as a test version or even a new release may contain unacceptable bugs, and an undo facility for design update would be extremely useful. There are specific known solutions to this general problem for particular areas, such as Windows update uninstall. This tool does not, however, know of modifications made to registry settings since the last update, for example any Dynamic Link Libraries (DLLs) which have been created.

In a templated environment, such as IBM's Lotus® Workplace™ (Lotus and Workplace are trade marks of IBM Corporation), if an application design is updated using a new template, the current application design is lost and later it is not possible to revert to the specific previous application design, only the previous design template, and thus there may be a loss of data.

A template is a collection of components and tools that work in concert to provide the foundation for an application, such as a discussion forum. Typically, a template is composed of pages that contain portlets and also includes tools for controlling access to the template and resulting applications.

Suppose one has an application comprising three components:

a Membership component, which includes component data which describes its Role definitions (e.g. "Teacher", "Student");

a Document Management component which includes component data which describes its folder layout; and a Portal component which includes component data which describes its pages and portlets.

Consider a design update, in which each of these components is to receive new designs, for example: a new role ("School Manager") and a modified role definition ("Teacher" no longer has delete rights) for the membership component; a different folder hierarchy for the document management component; and several new pages and some changes to the existing portlet layouts for the portal component. These design changes can be made by editing the template, thereby changing the underlying structure of future applications created from the template, using a template editor. Modifying a template does not alter applications that have already been created from it; template changes affect only applications created after template changes are made and saved.

Another option for altering an application exists, namely customizing the application itself (rather than the template), for example, by changing or removing an application component or editing roles that allow users certain permissions in the application. Thus, suppose prior to the design update mentioned above, some changes had been made to the application such that it no longer conforms to the 'original' previous design template. For example: a "Principal" Role having being added to the membership component (where originally these just contained "Teacher" and "Student"); an extra folder having been added to the document management component; or an unneeded portlet having been removed from the portal component. If a new design template were to be applied to the application, but later a rollback to the version of the application that existed prior to design update is required, it would not be possible to just re-apply the original design template, as this would not reflect these changes.

The present invention aims to address these problems.

SUMMARY OF THE INVENTION

The invention provides a method and system for updating the design of an application. The method comprises intercepting a design update request by an application update manager, which then requests a description of the current design of the application. When the description of the current design is provided it is stored in a versioning repository, and the new design update can then be applied.

The present invention facilitates the 'undoing' of an application design update from a template, by intercepting any design update requests and automatically creating and storing a description of the pre-update version of the application.

This facilitates rollback and avoids the problems mentioned above. When a developer intends to apply an update to a design of an application, the application is first asked to provide a description of itself, e.g. a template. If the application comprises a plurality of components, each application component provides a description. Thus a point-in-time design description of the application is created. This is stored and can later be used for an undo method or even multi-level rollback, as required.

This provides an easy mechanism of recording the previous design(s), and automatically including any of the application's components. No explicit component support for undo/rollback needs to be implemented, as long as it supports templating. Moreover, previous versions of the design can be persisted externally to the application in any document management or version control system.

A template may describe, in a text file, individual components in terms of name, invocation process, pre-requisite resources and configuration parameters, in such a manner as to be sufficient to backup all aspects of an application design, including, for example, any port or registry settings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

An application template is a portable persistent description of a configuration of a software system with defined 'points of variability', which are parameters which can be changed by a user or program developer to customize the software system to represent a particular application. A system using such application templates has been proposed by IBM Corporation, and is described in IBM's co-pending U.S. patent application Ser. No. 10/686,059.

In this system, when a user has configured a software system to a particular purpose using configuration and customization tools for each component in the software system, the user can create a template of the resultant configuration using a template tool. The user identifies the set of components in the software system that represents the application to be templated and browses the configuration of this set to identify the configuration elements which are to be set as the points of variability in the template. All other settings are considered fixed. The template tool traverses the set of components and extracts their prerequisites and content.

An example of such a system is Lotus Workplace. Each workplace application derives its properties from a template that defines the application. When a user edits the properties of an application, only the properties of that particular application are changed. Other instances of the application are not affected, and the template is not affected.

Application properties describe the workplace and include the workplace name, category, description, theme, owner, source template, creation date and time, and revision date and time. The application name and description are self-explanatory; the other properties require special consideration.

The category describes the type of application, for example, Team Space, Document Library, Web Conference, or Workplace Application. Workplace Application is a generic category for grouping applications other than Team Spaces, Document. Libraries, or Web Conferences. A user can select an existing category or create a new one. The category that is selected or created determines on which application list (catalogue) the application will appear. If the category of the application is changed, the workplace will no longer appear in the list of applications for its original category. For example, if the category of a workplace application is changed from Team Space to Document Library, the workplace application will no longer appear on the list of Team Space applications; it will appear on the list of Document Library applications. If a user creates a new category, the application will be listed in that new category. Creating a new category for an application does not affect the content of the application, the template that defines the application, or other instances of the application. The user will, however, need to create a catalogue portlet to list all applications in this new category and a page on which to show the list of applications in the new category.

The theme defines the style of the pages of the workplace application. Style elements include fonts, color, and images.

A user may choose to save an application as a new template. This new template becomes available for selection when users with the appropriate permission create new applications. When a user exports an application as a template, the user may assign all current workplace members the role of Template User. The properties and membership roles of the application are stored in the template. When users create workplaces from this new template, they can add members and assign roles using the Members or Participants portlet.

Component properties are the editable parameters provided by each application component that is used in the workplace application. For example, a workplace application might contain one or more team projects, document libraries, discussions, a membership list, a team calendar, and a team task list. Application components are typically implemented as portlets and deployed on the pages of the workplace. The properties of the application components in the runtime instance of the workplace are defined as parameters and stored in the workplace template. The parameters for a given application component specify whether the corresponding property value can be edited by users. The parameter must be checked as Value Can Be Edited for the parameter to appear in the workplace application as a Component property.

A representation of an application template for an application called Classroom comprises a Membership Component, a Document Management component, and a Portal component.

The membership component template lists variables, including import variables, export variables, and points of variability; prerequisites; and component data. The import variables are variables which are required for instantiation of the membership component; and the export variables are made available as input to other components upon instantiation. The points of variability are configurable parameters whose values need to be provided by a user of the template. The prerequisites list backend resources to which the component refers, typically identified by name and version. The component data is data specific to the component and in this example includes a list of Roles, as mentioned above.

Figure 1:
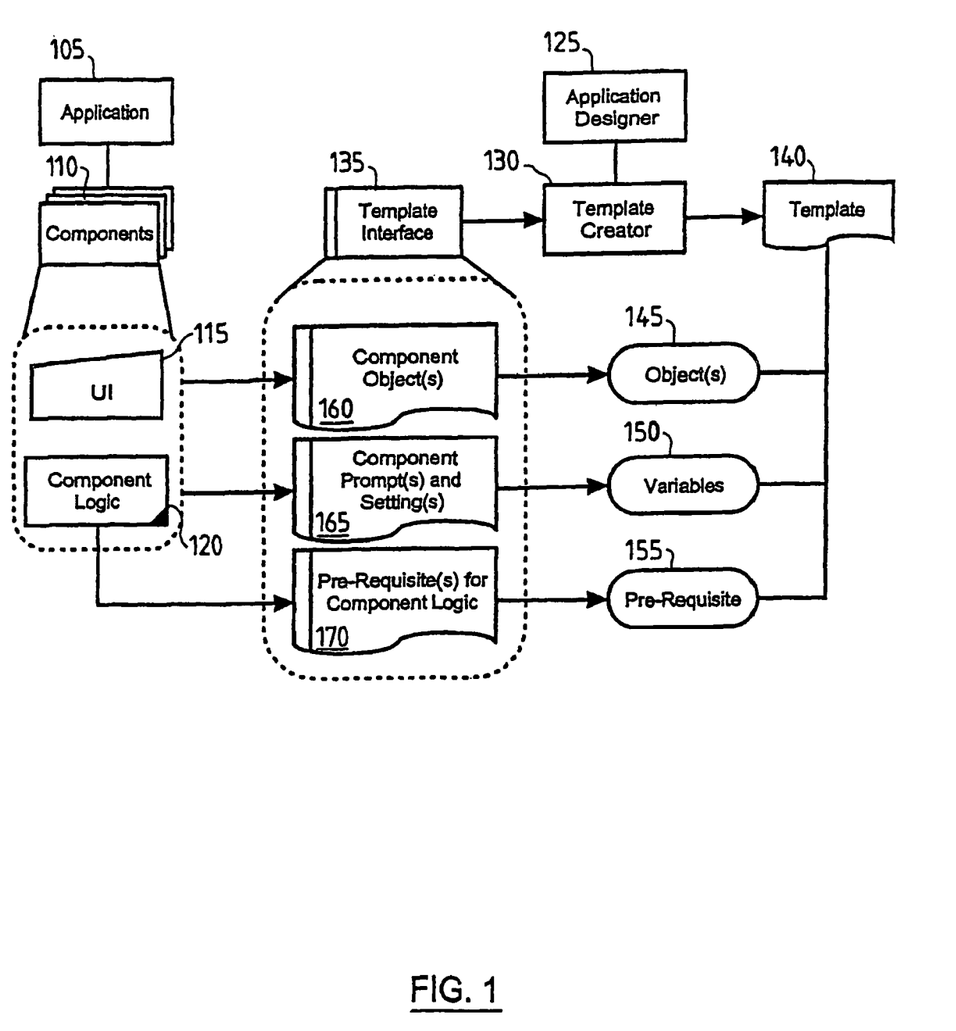
FIG. 1 shows a block diagram of a system for creating an application and/or a template.

FIG. 1 is block diagram of a system for designing an application using templates and for creating templates having points of variability. The system can include an application 105 including a multiplicity of application components 110. The application 105 can reflect a customized configuration of a generic software system particular to a specific problem space. In furtherance of this purpose, the application can include a collection of data stores, logical components, end user roles, end user activities, and application tools. Each can be coordinated with one another to form the basis of an application instance having a specific configuration.

Different ones of the components 110 can include component logic 120 dictating the behavior of the components 110. Additionally, to the extent that a view can be associated with one or more of the components 110, a user interface 115 can further be provided. To support the operation of the application 105 and the respective component logic 120 of the components 110, an application server (not shown) can be provided. Optionally, a portal server (also not shown) further can be provided to support user interaction with the component logic 120. In any case, as it will be recognized by the skilled person, a particular configuration can be required to coordinate the operation of the application 105 in order to produce a computing experience applicable to a specific problem space. Yet, the lack of a rigid, constant arrangement and configuration of the components 110 can lend itself to flexibility in producing multiple different computing experiences directed to a unique problem space.

Importantly, to reproduce a specific arrangement and configuration of the components 110 of the application 105 as a persistent solution applicable to a particular problem space, a template 140 can be produced to reflect the unique arrangement and configuration of the components 110. Specifically, a template creation process 130 coupled to an application designer 125 can generate elements of the template 140 which subsequently can be used to reproduce the specific arrangement and configuration of the components 110. In particular, the elements can include a component specification 145 of the components 110 arranged to form the application 105, one or more points of variability 150 within the components 110, and a specification of pre-requisites 155 required for the operation of the application 105 as configured.

The component specification 145 can include one or more references to those ones of the components 110 forming the application 105 specified by the template 140. The points of variability 150, by comparison, can include respective references to configurable elements and of the configuration of the component objects 160 referenced in the component specification 145. The configurable elements can include configuration settings and parameters and can be range limited within the template 140. Finally, the pre-requisites specification 155 can indicate within the template 140 those pre-requisite resources 170 which are required for the operation of the application 105 as configured and described in the template 140. Exemplary pre-requisite resources 170 can include data store accessibility logic, content transformation logic and the like.

To facilitate the creation of the template 140, a template interface 135 can be provided for implementation by the components 110 of the application 105. The template interface 135 can include a specification of methodologies used by the template creation process 130 to describe the individual components 110 in terms of name, invocation process, pre-requisite resources and configuration parameters. By implementing the template interface 135, the component objects 160 of the application 105 can permit their inclusion in the template creation process 130.

Figure 2:
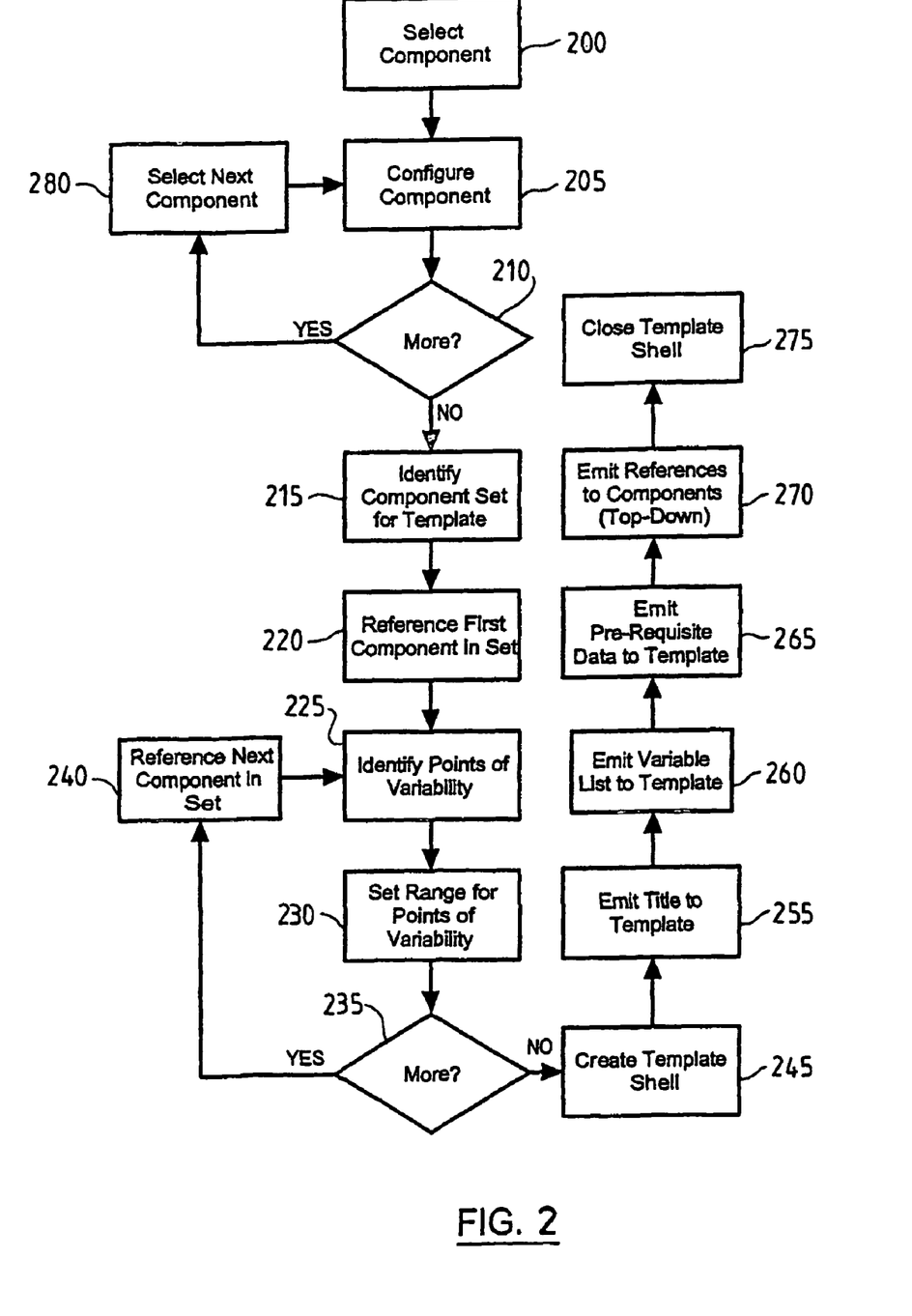
FIG. 2 shows a flow-chart illustrating a process for producing a template.

Turning now to the specific operation of the template creation process 130, FIG. 2 is a flow chart illustrating a process for producing a template having points of variability. Beginning in block 200 and continuing through blocks 205, 210 and 280, each component in the application can be configured as desired to produce a customized application. In this regard, the configuration process can include specifically arranging a selection of the components of the application to serve a specific problem space. In addition, component parameters can be established to further suit the specific problem space. As an example, field labels and the arrangement of elements in a form can be modified to better suit data input and review for a customized version of the application.

In any case, once the application has been customized through the specific configuration, in block 215 the set of components to be arranged to form the application can be identified to the template creation process. Subsequently, in blocks 220 through 240, within each identified component, points of variability can be specified as can an allowable range of values or a default value for each point of variability. In decision block 235, when no further points of variability remain to be identified within the set of identified components, all other configuration elements for the customized configuration can be considered fixed and in block 245 a template shell can be created for the customized configuration of the application and its respective points of variability.

In particular, in block 255 a title for the customized arrangement and configuration can be "emitted" to the template. In this regard, the title can be written to the template file, for example, in the form of title content demarcated by markup language tags conforming to a pre-formed document type definition for the template. Additionally, in block 260 the points of variability of block 225 and their respective ranges or default values of block 230 can be emitted to the template in block 260. In block 265, the pre-requisite data for the application can be emitted to the template as well in order to indicate those resources which are required for the suitable operation of the application as configured in the customized arrangement.

Significantly, the collection of components specified in block 215 can be traversed through the template creation process. In block 270, for each component in the collection, a reference to the component can be written to the template based upon which the component can be accessed when customizing the application for operation in accordance with the persisted definition of the customized application. To the extent that the components are inter-related through a series of interdependencies, the references to the components can be emitted to the template in a top-down manner. Once the references to the components have been emitted, the template shell can be closed in block 275 and a reproducible representation of the customized application can be persisted therein.

It will be recognized by the skilled person that the components of the application may not inherently include an interface suitable for integration with the template creation process of the present invention. Consequently, where feasible, the individual components can implement an interface associated with the template creation process so as to permit the template creation process to query the components for their contents and characteristics. Yet, where a component has not implemented the preferred interface, a proxy can be used in its place to extract the template content.

Once the template has been created, at any subsequent time, the customized application can be recalled through a processing of the template in which the customized application had been persisted.

Figure 3:
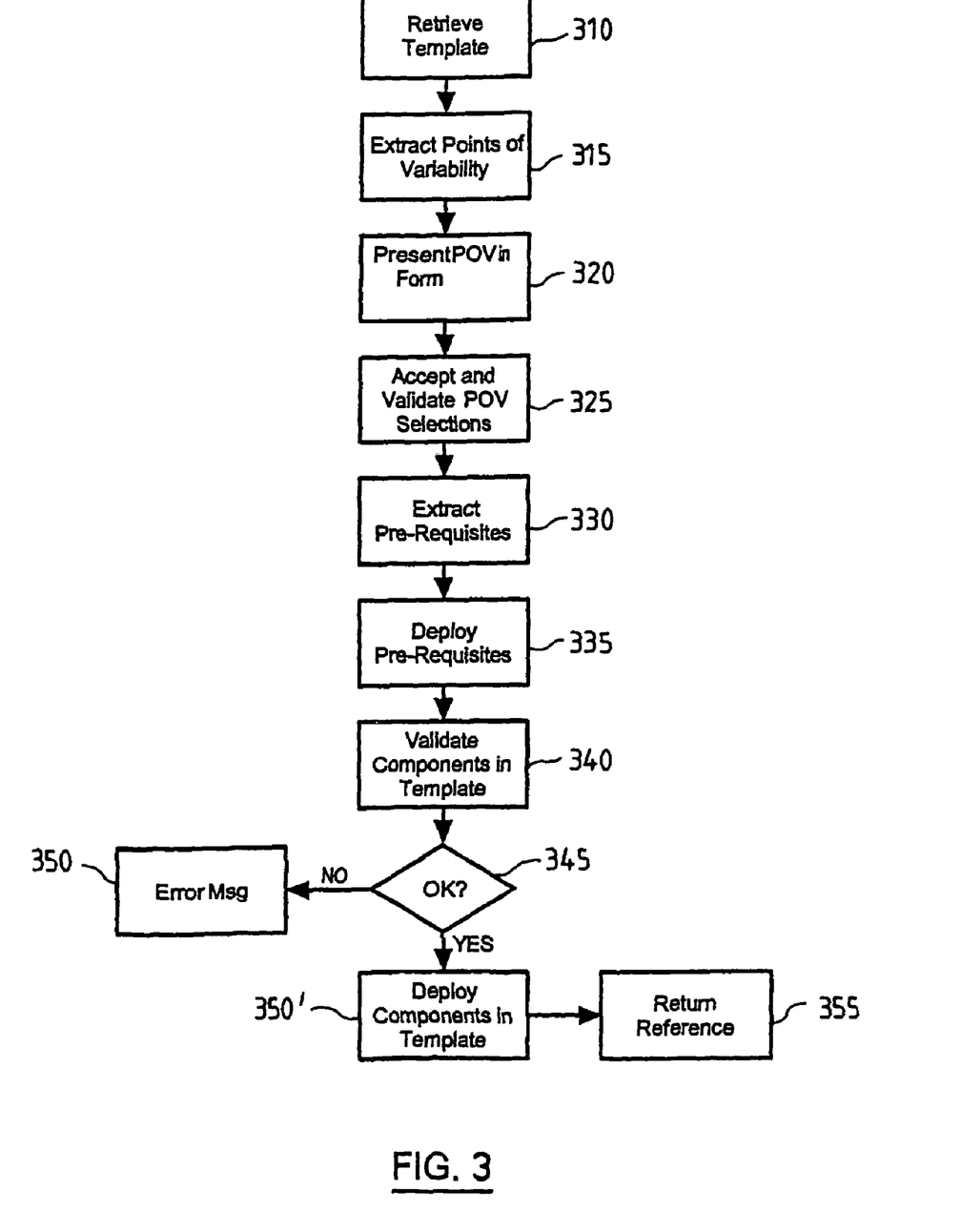
FIG. 3 shows a flow chart illustrating the use of a template to apply a new design.

FIG. 3 is a flow chart illustrating the application of a new design template, such as a new template produced through the process of FIG. 2. In block 315 the points of variability within the new template can be extracted as can a set of associated default values or ranges for the points of variability.

Notably, within the template, a set of prompts can be included for presentation to the end user when soliciting values for the points of variability. Accordingly, in block 320 the prompts can be presented through a form to receive values for the points of variability. Within the form, the acceptable ranges and any default values further can be presented in association with the points of variability. In any case, in block 325 each of the selections for the individual points of variability can be accepted and validated for consistency with the acceptable range of values.

In block 330, the pre-requisite resources for the arrangement of the components and operation thereof can be extracted from the template. Subsequently, each of the referenced pre-requisite resources can be deployed. In block 340, each of the components specified in the template can be validated. To the extent that the components are arranged in a hierarchy of dependent components, the hierarchy can be descended recursively both during the validation phase and during the deployment phase. When each component has been deployed, a resulting reference can be passed to components which depend upon the deployed component.

Notably, if in decision block 345 the components fail to validate successfully, in block 350 the error can be handled accordingly. Otherwise, in block 350 each of the components can be deployed as specified by the template and the accepted points of variability can be applied thereto. Finally, in block 355 a reference to the application can be returned as an instance in the template management application and through which interaction with the application can commence.

The system and method of the preferred embodiment will now be described in detail with reference to FIG. 4. The system comprises an Application Update Manager and a Versioning Repository, which may be any type of data store, in addition to the Classroom application 400, Membership component 412, Portal component 426 and Document Manager component 424.

When a new design for the Classroom application is required the Application Update Manager 410 asks 430 the application 400 to describe itself. The application in turn asks each of its components 412, 426 and 424 to describe themselves. Each component provides an instance description which contains everything needed to recreate instances of the components at that point in time. The descriptions are aggregated together by the Classroom application and stored as a single XML document in the Versioning Repository 420. A rollback position has thus been created. The Application Update Manager then applies 432 the new design, which is defined by template 10', to the Classroom application.

Figure 5A:
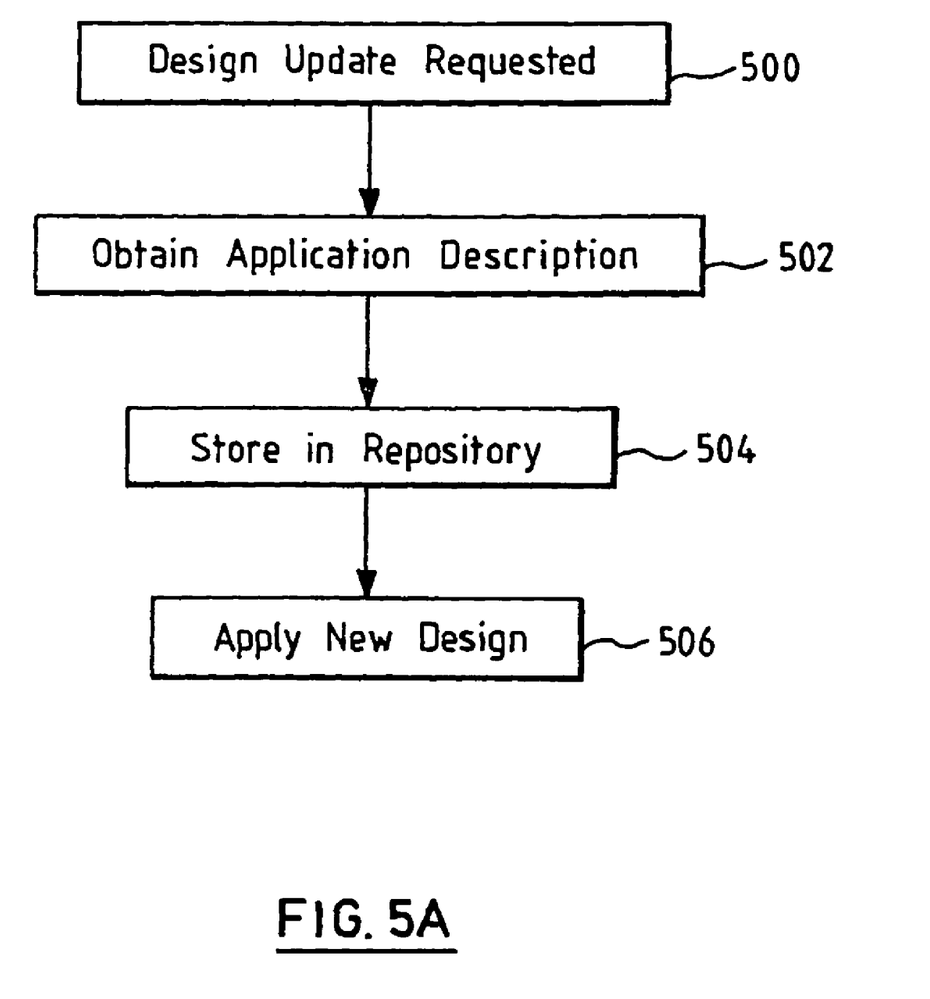
FIGS. 5*a* and 5*b* show flowcharts explaining the steps taken in design update and design rollback according to an embodiment of the invention.

Referring to FIG. 5a, in terms of the steps taken to perform a design update, when a design update request is received 500, the application update manager obtains 502 a current application description from the application, stores 504 this description in the version repository, and then applies 506 the new design.

Figure 4:
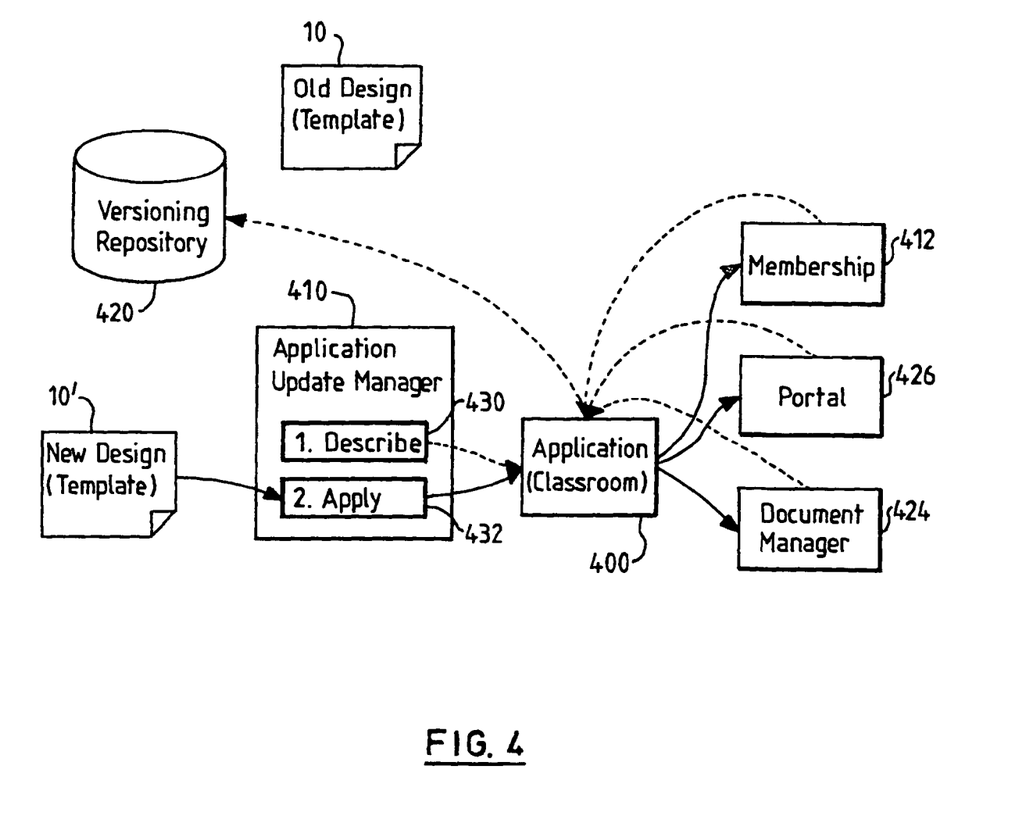
FIG. 4 shows a representation of a system according to an embodiment of the invention.
Figure 5B:
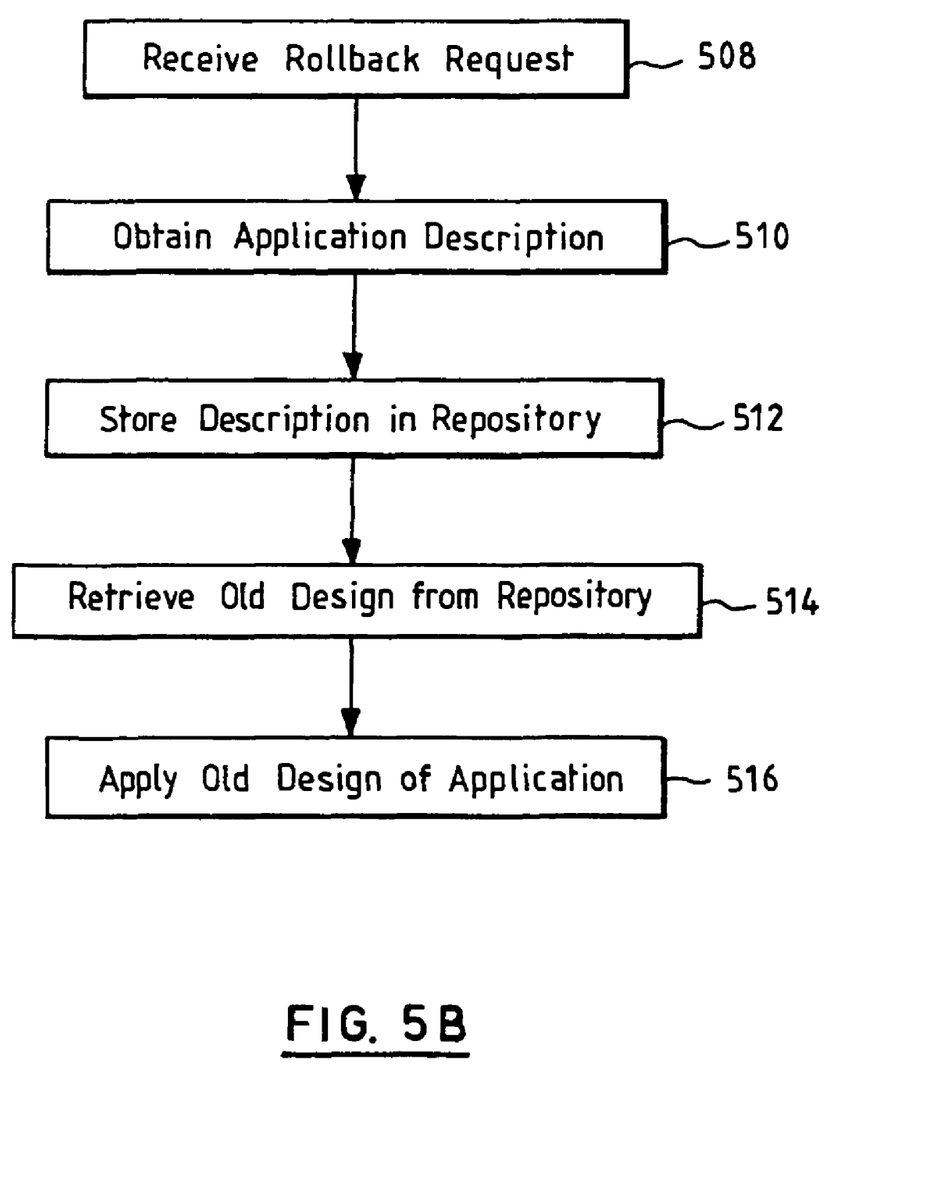

If it is decided to rollback to a previous version of the application, then the same process can be followed, except that the old version of the design is retrieved from the version repository and used where "New Design (Template)" is shown in FIG. 4. Referring to FIG. 5b, when a rollback request is received 508, the application update manager obtains 510 a description of the application, stores 512 this description in the versioning repository, retrieves 514 the previous design, specified the rollback request, from the versioning repository, and then applies 516 this previous design. Steps 510 and 512 are optional in the case of rollback, but may be used in order to provide a "Redo" feature.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

We claim:

1. A computer-implemented method of updating the design of an application, the application comprising a set of at least one component, the method comprising the steps of:
   intercepting design update requests by an application update manager;
   in response to the receipt of a design update request by the application update manager, requesting, by the application update manager, from the application, a description of a current design of the application at the time of the update request, wherein the description of the current design of the application at the time of the update request includes parameters for user configurable points of variability in the application prior to performing the requested update, and includes an aggregation of descriptions provided by each component of the application, wherein the description of each component describes the component at the time of the update request;
   receiving from the application by the application update manager the description of the current design of the application at the time of the update request, and storing the description of the current design of the application at the time of the update request in a versioning repository;
   applying the new design;
   receiving a rollback request;
   obtaining responsive to receipt of the rollback request, a description of a current design of the application at the time of the rollback request, wherein the description of the current design of the application at the time of the rollback request includes parameters for user configurable points of variability in the application prior to performing the requested rollback, and includes an aggregation of descriptions provided by each component of the application, wherein the description of each component describes the component at the time of the rollback request;
   receiving the description of the current design of the application at the time of the rollback request, and storing the description of the current design of the application at the time of the rollback request in the versioning repository;
   retrieving, responsive to receipt of the rollback request, a previous design, wherein the previous design comprises the description of the current design of the application at the time of the update request; and
   applying the previous design.

2. The method according to claim 1, further comprising:
   creating a template of the current application design and storing the template.

3. The method according to claim 2, wherein creating a template comprises identifying the set of components forming the current application design and also configurable elements which can be assigned values when deploying said set of components.

4. The method according to claim 2, further comprising determining pre-requisite resources required by the current application design and identifying said determined pre-requisite resources in said template.

5. The method according to claim 1, further comprising accessing a template interface implemented by said set of components to permit access to content encapsulated in said set of components.

6. The method according to claim 1, further comprising accessing, through a proxy, content encapsulated in a component within said set of components which has not implemented a template interface.

7. The method according to claim 1, wherein applying the new design comprises deploying a new design template.

8. A system for updating an application design, the system comprising:
- at least one processor;
- a memory;
- application update manager program code stored in said memory for execution on said processor, said application update manager program code for, when executed on said processor, performing the steps of
  - intercepting design update requests;
  - in response to the receipt of a design update request, requesting, from the application, a description of a current design of the application at the time of the update request, wherein the description of the current design of the application at the time of the update request includes parameters for user configurable points of variability in the application prior to performing the requested update, and includes an aggregation of descriptions provided by each component of the application, wherein the description of each component describes the component at the time of the update request;
  - receiving, from the application, the description of the current design of the application at the time of the update request, and storing the description of the current design of the application at the time of the update request in a versioning repository;
  - applying the new design;
  - receiving a rollback request;
  - obtaining, responsive to receipt of the rollback request, a description of a current design of the application at the time of the rollback request, wherein the description of the current design of the application at the time of the rollback request includes parameters for user configurable points of variability in the application prior to performing the requested rollback, and includes an aggregation of descriptions provided by each component of the application, wherein the description of each component describes the component at the time of the rollback request;
  - receiving the description of the current design of the application at the time of the rollback request, and storing the description of the current design of the application at the time of the rollback request in the versioning repository;
  - retrieving, responsive to receipt of the rollback request, a previous design, wherein the previous design comprises the description of the current design of the application at the time of the update request; and
  - applying the previous design.

9. The system according to claim 8, further comprising:
a template interface for exposing content included within components implementing said template interface, and also for deploying said components implementing said template interface.

10. The system according to claim 9, further comprising:
a template creation process coupled to said template interface, said template creation process being operable to create a template including a reference to a set of components and also configurable elements of said set of components.

11. The system of claim 10, wherein said template includes a reference to a pre-requisite resource required by the application.

12. A computer program product including a computer readable memory, the computer readable memory having stored thereon program code for updating the design of an application, the application comprising a set of at least one component, the program code comprising:
- program code for intercepting design update requests by an application update manager;
- program code for, in response to the receipt of a design update request by the application update manager, requesting, by the application update manager, from the application, a description of a current design of the application at the time of the update request, wherein the description of the current design of the application at the time of the update request includes parameters for user configurable points of variability in the application prior to performing the requested update, and includes an aggregation of descriptions provided by each component of the application, wherein the description of each component describes the component at the time of the update request;
- program code for receiving, from the application by the application update manager, the description of the current design of the application at the time of the update request, and storing the description of the current design of the application at the time of the update request in a versioning repository;
- program code for applying the new design;
- program code for receiving a rollback request;
- program code for obtaining, responsive to receipt of the rollback request, a description of a current design of the application at the time of the rollback request, wherein the description of the current design of the application at the time of the rollback request includes parameters for user configurable points of variability in the application prior to performing the requested rollback, and includes an aggregation of descriptions provided by each component of the application, wherein the description of each component describes the component at the time of the rollback request;
- program code for receiving, the description of the current design of the application at the time of the rollback request, and storing the description of the current design of the application at the time of the rollback request in the versioning repository;
- program code for retrieving, responsive to receipt of the rollback request, a previous design, wherein the previous design comprises the description of the current design of the application at the time of the update request; and
- program code for applying the previous design.

* * * * *